Dec. 29, 1931.  J. E. THORNTON  1,839,064

CINEMATOGRAPH SPOOLCASE

Filed Jan. 26, 1927  2 Sheets-Sheet 1

INVENTOR
J. E. Thornton.

Dec. 29, 1931. J. E. THORNTON 1,839,064
CINEMATOGRAPH SPOOLCASE
Filed Jan. 26, 1927 2 Sheets-Sheet 2

INVENTOR
J. E. Thornton
BY Lowden O'Brien
ATTORNEY

Patented Dec. 29, 1931

1,839,064

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

CINEMATOGRAPH SPOOLCASE

Application filed January 26, 1927, Serial No. 163,807, and in Great Britain February 24, 1926.

This invention relates to improvements in spoolcases for cinematograph film apparatus.

The object of the invention is to produce a spoolcase which may be inserted on to the usual spindles for driving the drum and spool of a cinematograph camera or projector whereby the film is permanently protected within the casing of the spoolcase and needs no threading through the camera or projector. The drum and spool are rotated by mechanism on the camera or projector, such mechanism forming no part of the present invention.

The invention consists of a detachable spoolcase comprising in combination with a casing of a drum upon which the film is wound a hollow spindle passing through one side of the casing upon which the drum is mounted, a spool arranged in line with the drum upon which the film is wound after exposure, a second hollow spindle passing through the side of the casing upon which the spool is mounted, a leader strip permanently affixed at one end to the drum and at the other end to the forward end of the film, a second leader strip permanently affixed at one end to the spool and at the other end to the rear of the film, guides for the film as it is fed forward past an aperture in the casing, a shutter for the aperture, further hollow spindles passing through the casing and a sprocket wheel mounted on each spindle to deliver the film to and from the exposure aperture.

In my pending application Serial No. 163,805 filed Jan. 20, 1927, I have described a spoolcase in which the mechanism for feeding the film past the exposure opening is mounted therein whilst in the present application no such mechanism is provided in the spoolcase.

The invention will be described with reference to the accompanying drawings in which:—

Figure 1:
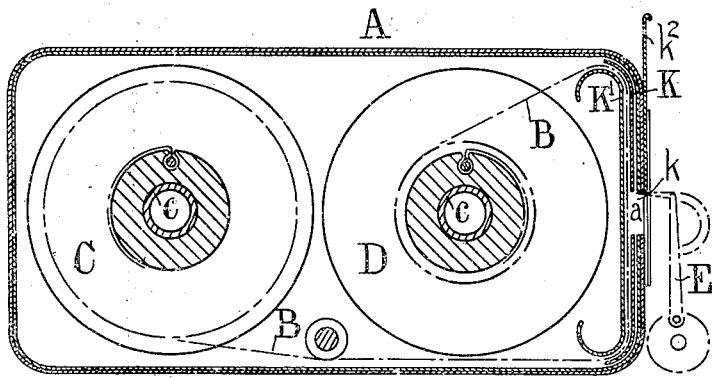
Fig. 1 shows a spoolcase with spools of comparatively small diameter and light weight for use horizontally and more particularly applicable for use in a camera, and the film is drawn directly and intermittently from the supply-spool by the claw-motion which is part of the camera and serves the double purpose of film feed and film shift.
Figure 4:
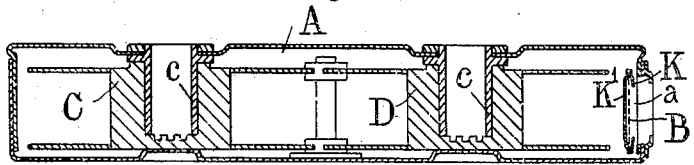
Fig. 4 is a transverse section of Fig. 1.
Figure 2:
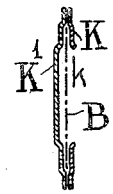
Fig. 2 is a transverse section through the film-gate and exposure aperture.

The spoolcase A shown in Fig. 1 is of the simplest form, the exposure aperture $a$ being at the front end of the case and the spring plates K K1 forming the spring gate being arranged immediately behind the aperture $a$. The front plate K is provided with an aperture $k$ for the exposure of the film. The rear plate K1 is formed without an aperture when the spoolcase is for use in a camera as shown in Fig. 1, but is provided with an aperture corresponding to the aperture $k$ when the spoolcase is intended for use in a projector to allow the light to be projected through the film B. The supply-spool C and receiving-reel D are arranged tandem fashion behind the spring-gate K, K1.

The spools C and D are carried in the case A or they may be mounted in a separate frame arranged therein. The cores $c$ of the spools are hollow to fit over projecting spindles in the camera (or projector) and be driven thereby.

A slide or shutter $k2$ is arranged at the front of the exposure aperture $a$ so that the latter can be closed when the spoolcase is not in position in the camera.

The claw or similar device E for intermittently moving the film B is mounted in and forms part of the camera or projector.

Crown teeth, pins and slots or other suitable devices are provided to form a driving connection between the hollow cores $c$ of the spools and the projecting spindle on the camera (or projector).

When the spoolcase is inserted into the camera or projector the ends of the cores of the spools C and D engage the spindles of the camera or projector and the claw is engaged with the traction perforations of the film B. In this simple form of spoolcase the claw E serves the double purpose of drawing the film directly from the supply-spool C and also of intermittently moving it across the exposure aperture.

Figure 3:
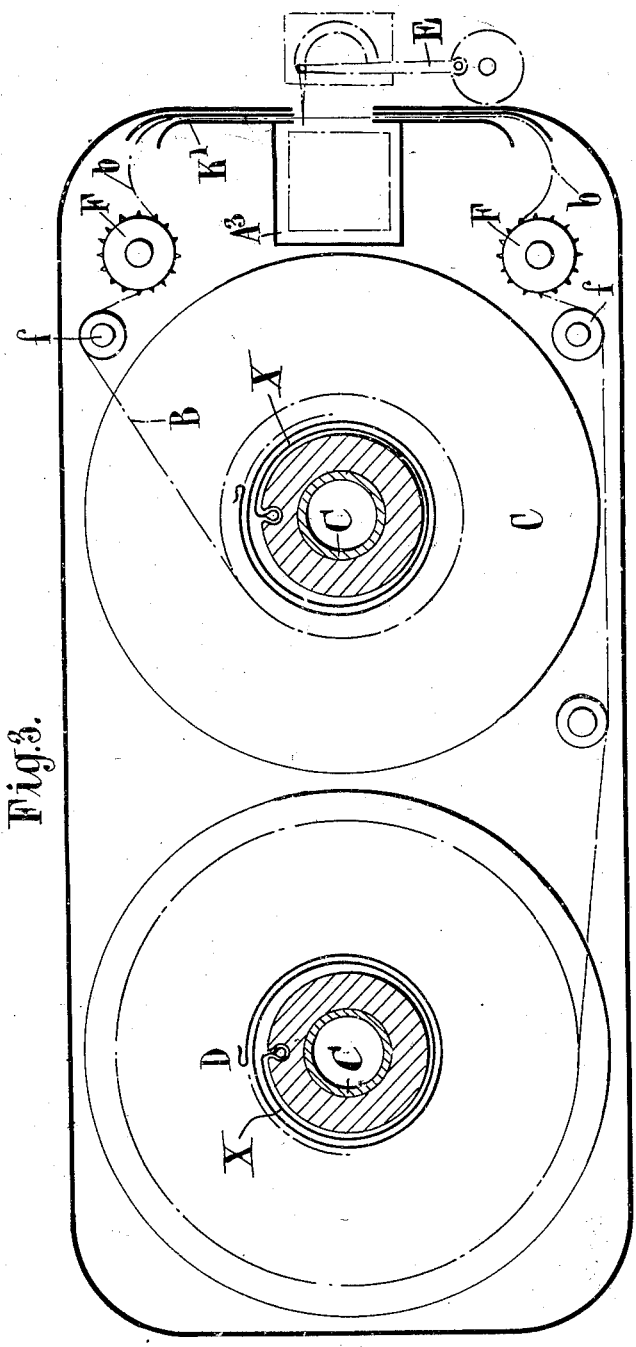
Fig. 3 shows a spoolcase, for use horizontally and more particularly applicable for use in a projector, in which the film is continuously fed and moved by a pair of small continuously rotating sprockets, is formed into loops, and is intermittently shifted by the claw feed of the projector.

The spoolcase shown in Fig. 3 is similar to that shown in Fig. 1 but contains spools C and D of larger size and is consequently provided with two continuously rotating sprockets F mounted on hollow shafts to engage spindles on the projector when the case is placed in position thereon. The spoolcase shown in Fig. 3 is intended for use in a projector and accordingly the rear spring plate K1 is provided with an aperture for the passage of the light and the case is provided with a chamber $A^3$ to receive a prism for reflecting the light from an outside source through the film. Idle rolls $f$ are preferably provided to guide the film to and from the spools.

The two sprockets F feed the film B from and to the spools and the film describes loops or slack $b$ between the sprockets and the spring-gate K, K1. The pull, load or strain of the two spools C and D is thus taken by the continuously rotating sprockets F and the only load upon the claw movement E is the weight of the film in the loops $b$.

A slide or closure member $k2$ is arranged at the front of the exposure aperture $a$ so that the latter can be closed when the spoolcase is not in position in the camera, or projector. The claw or similar device E for intermittently moving the film B is mounted in and forms part of the camera or projector. When the spoolcase is inserted into the camera or projector the ends of the cores of the spools C and D engage the spindles of the camera or projector and the claw of the camera or projector engages with the traction perforations of the film B in the spoolcase. Idle rolls $f$ are preferably provided to guide the film to and from the spools.

The sprocket F1 feeds the film B from and to the spools and the film describes loops or slack $b$ between the sprocket and the spring-gate K, K1. The pull, load or strain of the two spools C and D is thus taken by the continuously rotating sprocket F1 and the only load upon the claw movement E is the weight of the film in the loops $b$.

*Spoolcase*

The casing portion of the spoolcase comprises two shallow trays which fit one over the other like a box and lid, such case preferably being stamped or drawn from thin sheet aluminum and suitably ribbed to stiffen it.

*Leader-strips*

The leader-strips X by which the film is attached to the spool and reel may be of the type made of paper or film but I prefer to use those of the unbreakable type, of very strong construction, for example a double thickness of linen tape, or a double thickness of paper with a linen tape insertion, the three layers being cemented together, or a double thickness of strong parchmentized paper cemented together.

There are two such leader-strips X of long length, one attached to each end of the film, one leader being attached by its other end to the spool and one to the reel. The effect of this arrangement is to permanently connect spool and reel so that either one or the other can be used to give motion to the film-strip, the spool, reel, two leaders, and one film forming a single connected movable unit.

What I claim as my invention and desire to protect by Letters Patent is:—

A detachable spoolcase for use in cinematograph film apparatus comprising in combination with a casing of a drum upon which the film is wound, a recessed hub upon which the drum is mounted, a hollow sleeve affixed to the casing upon which the hub rotates, crown gearing within the recess in the hub by which said drum is rotated by a projecting spindle from the cinematograph apparatus, a spool arranged in line with the drum upon which the film is wound after exposure a recessed hub upon which the spool is mounted, a hollow sleeve affixed to the casing upon which the hub rotates, crown gearing within the recess in the hub by which said spool is rotated by a projecting spindle from the cinematograph apparatus, a leader strip permanently affixed at one end to the drum and at the other end to the forward end of the film, a second leader strip permanently affixed at one end to the spool and at the other end to the rear end of the film, the film being intermittently fed forward by claw mechanism on the cinematograph apparatus synchronized with the rotation of the projecting spindles.

In testimony whereof I have hereunto set my hand.

JOHN EDWARD THORNTON.